DAVID ARONSON
INVENTOR.

DAVID ARONSON
INVENTOR.

BY Daniel H. Bobis
Atty

DAVID ARONSON
INVENTOR.

United States Patent Office 3,440,832
Patented Apr. 29, 1969

3,440,832
ABSORPTION REFRIGERATION SYSTEM WITH
BOOSTER COOLING
David Aronson, Upper Montclair, N.J., assignor to
Worthington Corporation, Harrison, N.J., a corporation of Delaware
Filed Nov. 29, 1967, Ser. No. 686,584
Int. Cl. F25b 15/00
U.S. Cl. 62—101                                    15 Claims

ABSTRACT OF THE DISCLOSURE

This disclosure relates to an absorption refrigeration system having an auxiliary refrigeration system to cool the absorber and operated by energy in vapor leaving the generator. In one form, an ejector in the line between the generator and condenser is connected to the evaporator of the auxiliary system and in another form a turbine-compressor unit is operated by vapor from the generator or by steam generated by heat exchange with the vapor.

---

Figure 1:
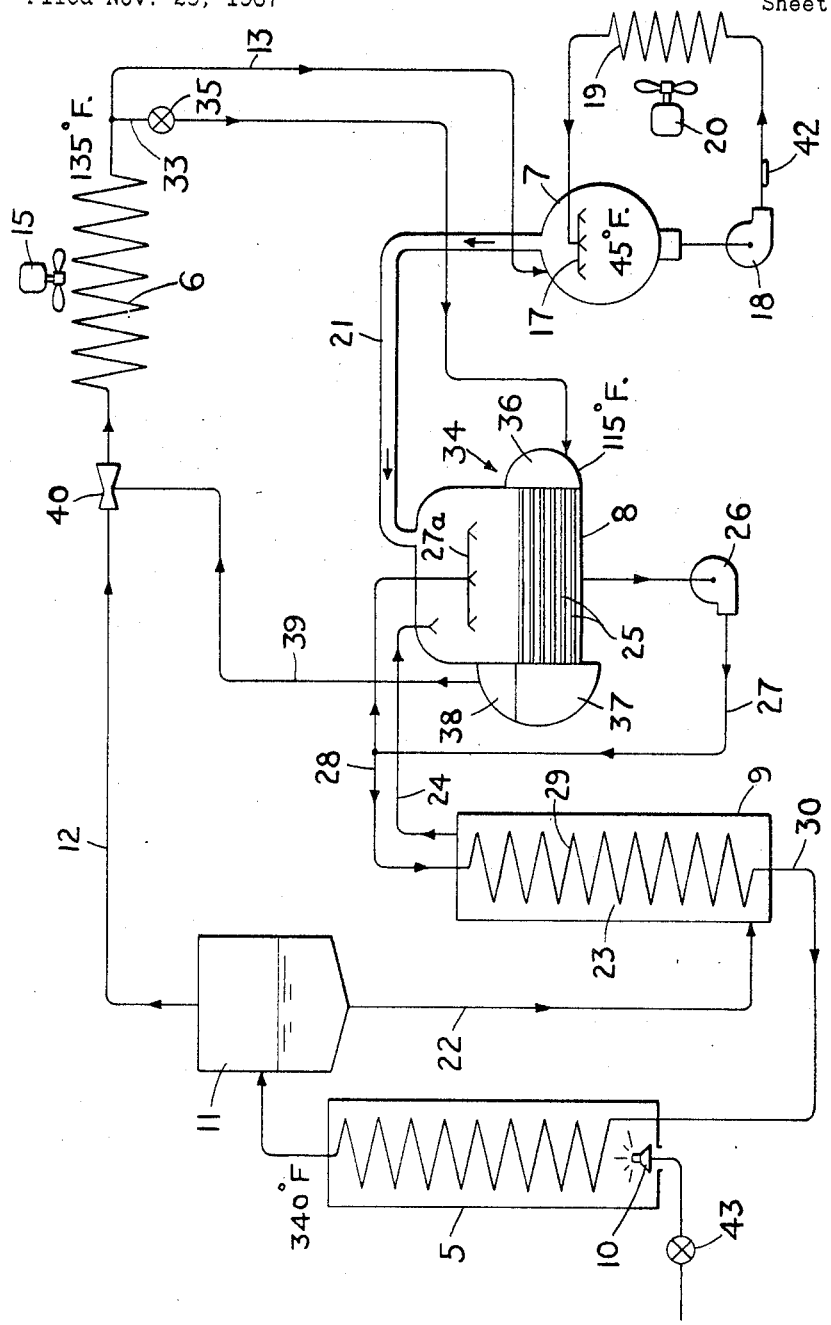

The present invention relates to absorption refrigeration and more particularly to a method of and apparatus for air-cooling absorption refrigeration systems of the type which require an absorber temperature below outside ambient temperatures.

For example, absorption refrigeration systems which use water as a refrigerant and a salt solution as an absorbent provide an ideal apparatus for cooling air in air conditioners. Such absorption refrigeration systems produce chilled water in a range of 40° F. to 50° F., completely avoid toxic or fire hazards, operate at low pressure, and have a high coefficient of performance. However, when a lithium bromide solution is used as the absorbent and is cooled down to only 128° F., then a 65.5% concentration of lithium bromide salt is required to produce chilled water at 45° F. A solution of lithium bromide at such a high concentration is on the borderline where crystallization of salt from solution will occur. Such salt crystals are apt to grow on the walls of conduits or collect in narrow openings and plug the lines. On the other hand, if the temperature of the absorber is brought down to 115° F., then a 62% solution of lithium bromide is capable of cooling water to 45° F. without any danger of crystallization of salt out of solution.

Air cooling of the absorber in such a system to a safe operating temperature cannot be depended upon for extreme ambient air temperatures which may occur in different geographical locations where the air conditioner is apt to be used. Furthermore, high ambient temperatures occur when maximum refrigeration capacity is required. Therefore, to insure low absorber temperatures for maximum load conditions, a cooling tower, or some other form of a auxiliary equipment is used to cool the absorber to an operating temperature well below 115° F.

One of the objects of the present invention is to provide an improved method of and arrangement of elements for air cooling the absorber of an absorption refrigeration system to a safe operating temperature with outside ambient air at a higher temperature than the absorber.

Another object is to provide a method of and apparatus for air cooling a refrigeration system of the type indicated which utilizes energy developed in the system for cooling the absorption solution to produce a desired refrigerant temperature without danger of crystallizing salt from solution.

Another object is to provide an absorption refrigeration system of the type indicated which operates at a relatively high thermal efficiency.

Still another object is to provide an absorption refrigeration system of the type indicated which is of relatively simple and compact construction, economical to manufacture, and one which is reliable in operation.

These and other objects will become more apparent from the following description and drawings, in which like reference characters denote like parts throughout the several views. It is to be expressly understood, however, that the drawings are for the purpose of illustration only, and are not a definition of the limits of the invention, reference being had for this purpose to the appended claims.

Figure 2:
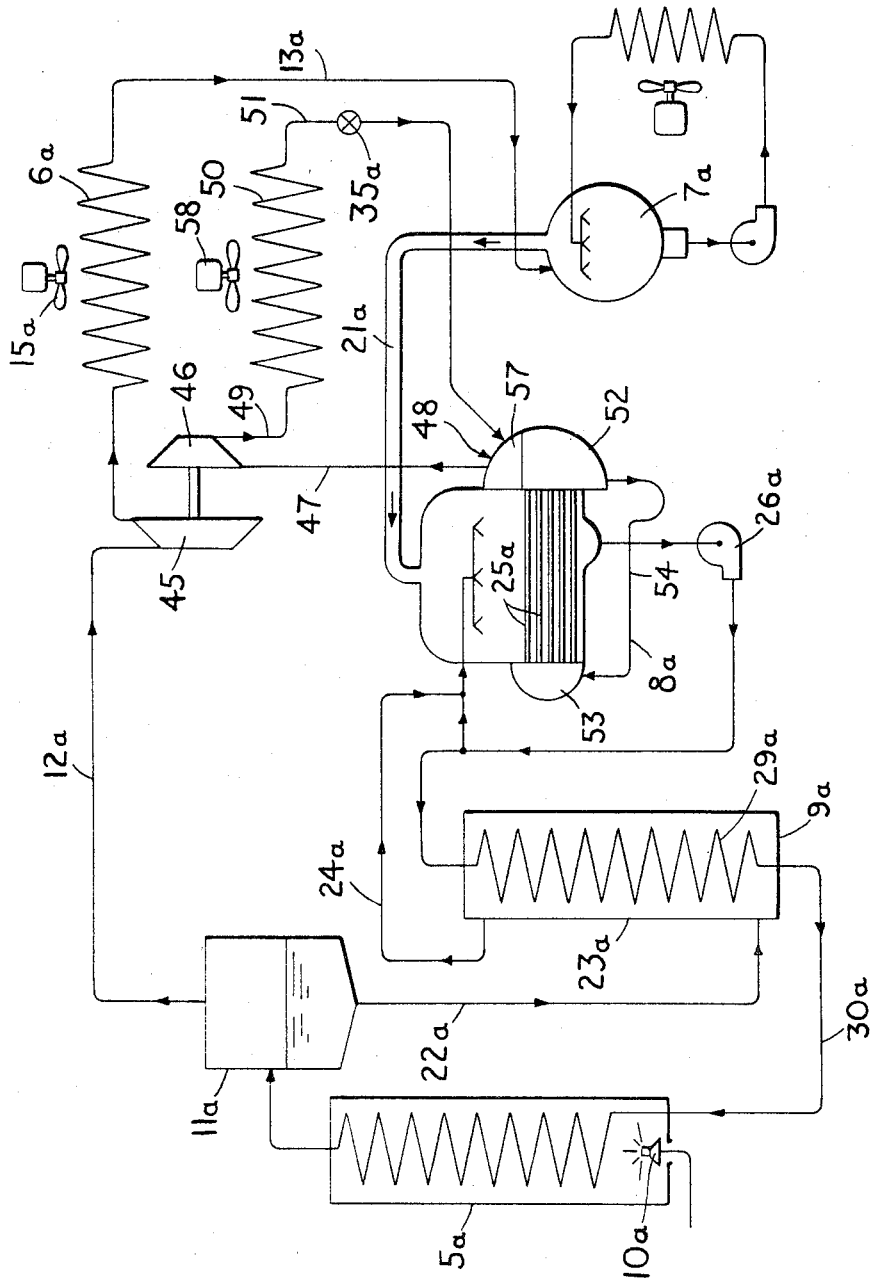
Figure 3:
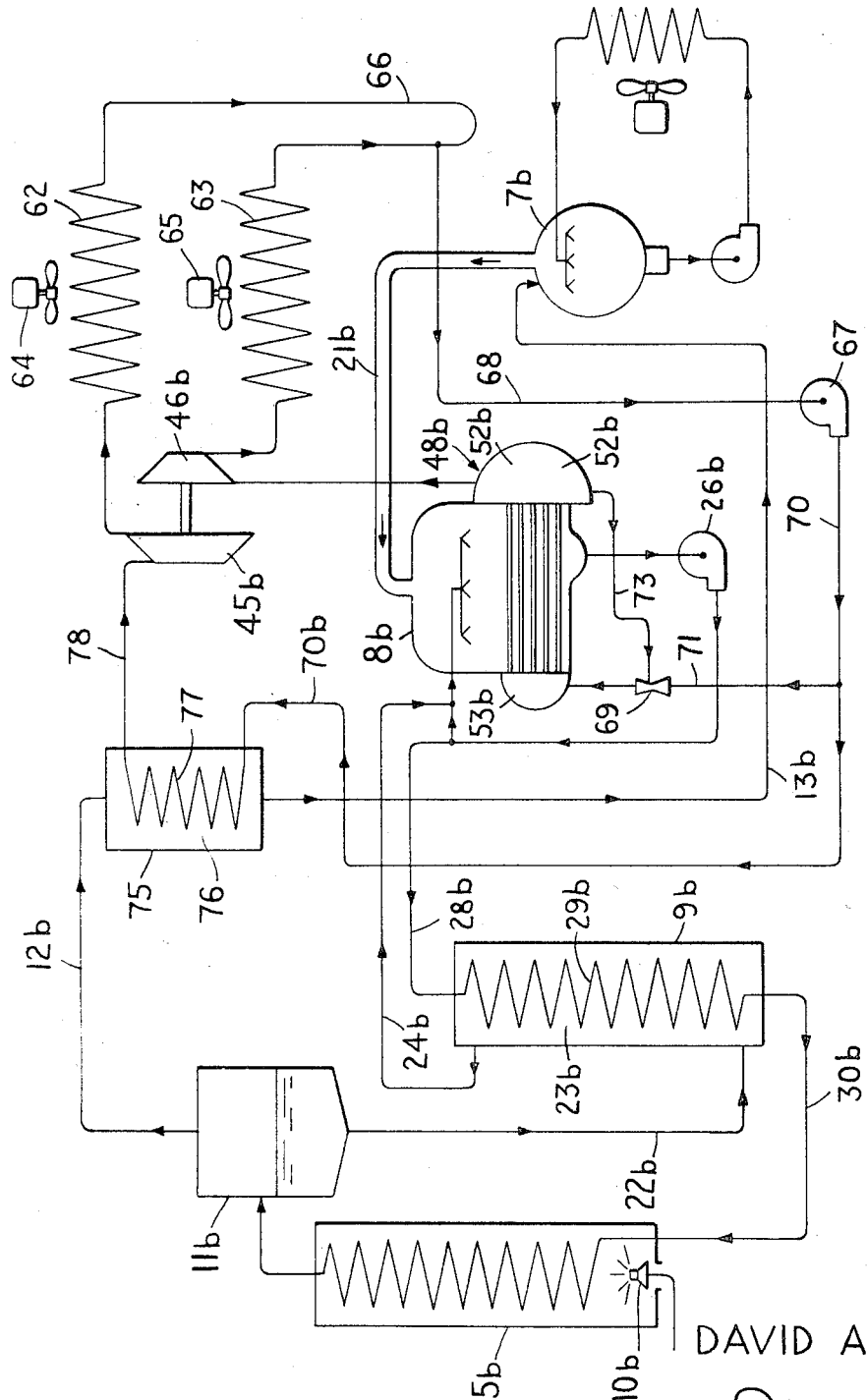

In the drawings:

FIGURE 1 is a diagrammatic view of an absorption refrigeration system incorporating the novel features of the present invention and showing an ejector operated by generated refrigerant vapor to cool solution in the absorber by evaporating a refrigerant in heat exchange with the solution;

FIGURE 2 is a diagrammatic view of an absorption refrigeration system like that illustrated in FIGURE 1 in which the solution in the absorber is cooled by a turbine-compressor unit operated by generated vapor to produce a suction on a secondary refrigerant; and FIGURE 3 is a view similar to FIGURE 2 showing the turbine-compressor unit operated by a secondary fluid vaporized from heat in the generated refrigerant.

The method of the present invention comprises the steps of heating a first body of absorption solution at a pressure corresponding to a temperature above the ambient atmosphere so that the refrigerant may be condensed by heat exchange with outside ambient air. In addition, the method comprises the step of cooling a second body of absorption solution in the absorber to a temperature which will produce a desired vapor pressure and temperature of refrigerant while avoiding crystallization of salt from solution. To this end, the second body of absorption solution is cooled by evaporating an auxiliary refrigerant in heat exchange therewith at a temperature below the condensing temperature and then compressing the resulting vapor to a higher temperature than the outside ambient to which its heat is dissipated. Furthermore, the steps of evaporating and compressing the auxiliary refrigerant are performed by utilizing energy in the refrigerant vapor expelled from the first body of solution so that no outside source of energy need be provided.

In one such method of cooling the second body of solution, the auxiliary refrigerant is aspirated by the flow of refrigerant vapor expelled from the first body of solution and the aspirated vapor is condensed with the generated vapor by heat exchange with outside ambient air. Instead of aspirating directly into generated refrigerant vapor, the vapor pressure of the auxiliary refrigerant may be reduced by the suction of a compressor in a turbine-compressor unit. The vapor expelled from the first body of solution drives the turbine and the compressor increases the temperature of the auxiliary refrigerant vapor above the ambient temperature so as to cause heat to flow from the auxiliary refrigerant to the ambient. In addition, the auxiliary refrigerant may circulate in a closed circuit independent of the refrigerant in the main absorption system and the circuit having a separate condenser which may be air cooled. The method also may be used with an auxiliary fluid that is not only circulated in a closed circuit separate from the main absorption refrigeration system, but receives its energy by heat exchange with the vapor expelled from the main body of solution. In all cases the refrigerant is expelled from the first body of absorption solution at a temperature above the outside ambient air so that it may be condensed by heat exchange with the ambient air; and the absorption solution is cooled to a temperature which will produce the required refrigerating temperature without danger of crystallization of salt from solution and the heat of absorption also is transferred to the outside ambient air. Thus, cooling towers, spray ponds, evaporative condensers, or other like auxiliary equipment to maintain a low absorber temperature are eliminated.

One form of apparatus for carrying out the method of the present invention is illustrated in FIGURE 1 of the drawings as applied to an absorption refrigeration system comprising a generator 5, a condenser 6, an evaporator 7, an absorber 8 and heat exchanger 9 interconnected for the flow of refrigerant and absorption solution. While the refrigeration system may contain any suitable working fluid or fluids a system containing a water solution of a salt, such as lithium bromide, will be described herein. Water expelled from solution by the application of heat constitutes the refrigerant and the remaining salt solution constitutes the absorbent.

Heat is supplied to the generator 5 by any suitable heating means such as a gas burner 10 which will heat the solution to a temperature above the ambient air temperature. The upper end of the generator 5 is connected to a separating chamber 11 where expelled refrigerant vapor is separated from the absorption solution. Vapor flows from the separating chamber 11 to the condenser 6 through a conduit 12 and from the condenser to the evaporator through a conduit 13. The liquid refrigerant from conduit 13 is sprayed into the evaporator 7 through nozzles 17, and liquid refrigerant in the evaporator is recirculated by a pump 18 through a heat transfer cooling coil 19 which, for example, cools air blown across its surface by a fan 20. Refrigerant vapor evaporated in the evaporator 7 flows through a conduit 21 into the top of the absorber 8 which is illustrated as a shell and tube type heat exchanger.

Strong absorption solution from which refrigerant has been expelled and having a high concentration of salt flows from the separating chamber 11 through the conduit 22 to one passage 23 of heat exchanger 9 and from said passage through a conduit 24 into the top of the absorber shell 8. While not shown, some form of restriction in the path of flow for strong solution is provided to maintain the difference in pressure between the generator 5 and absorber 8.

The strong absorption solution from the generator 5 flows over the surfaces of tubes 25 in the absorber 8 to provide an extended surface area and absorbs refrigerant vapor for which it has a high affinity. Thus, refrigerant vapor flows from the evaporator 7 through the conduit 21 to maintain a low pressure and temperature in the evaporator 7 corresponding to the vapor pressure of the refrigerant in the absorbent at the temperature in the absorber. Absorption solution of intermediate strength is recirculated in the absorber 8 by a pump 26 and conduit 27 forming a loop circuit from the bottom to the top of the absorber. Recirculated absorption solution is sprayed into the absorber 8 through nozzles 27a to further extend the surface area of the solution in the absorber. A branch conduit 28 connects the conduit 27 beyond pump 26 to a second passage 29 through the heat exchanger 9, and solution from this passage flows through a conduit 30 back to the generator 5. As thus far described the absorption refrigeration system is of conventional form.

In accordance with the present invention, part of the refrigerant condensed in the condenser 6 passes through a conduit 33 to an auxiliary evaporator 34 in heat exchange with absorption solution in the absorber 8. Conduit 33 has a valve 35 therein which controls the amount of liquid refrigerant flowing to the evaporator 7 and auxiliary evaporator 34, respectively. The auxiliary evaporator 34 comprises headers 36 and 37 overlying the ends of the tubes 25 at opposite ends of the absorber 8, respectively. Liquid refrigerant flows from header 36 through the tubes 25 into the header 37 of auxiliary evaporator 34 in heat exchanger with absorption solution in the absorber 8 at the exterior of the tubes. As shown in FIGURE 1, both headers 36 and 37 cover the ends of the tubes 25, but the header 36 extends above the tubes to provide a vapor space 38. Vapor space 38 of header 37 is connected by a conduit 39 to an ejector 40 connected in the line 12 through which refrigerant vapor flows from the generator 5 toward the condenser 6. The ejector 40 has a Venturi throat so that the vapor flowing therethrough will create a partial vacuum in the throat and aspirate refrigerant vapor from the vapor space 38 in the header 37. The flow of refrigerant vapor into the ejector reduces the vapor pressure and temperature in the auxiliary evaporator 34 to cool absorption solution in absorber 8 to the required temperature to maintain a temperature of, for example, 45° F. in evaporator 7 without danger of crystallizing salt from solution in the absorber.

Operation of the refrigeration system may be controlled by any suitable type of control such as the thermal element 42 for feeling the temperature of the refrigerant in the evaporator 7 and connected to operate a modulating valve 43 in the line to the gas burner 10 to vary the heat supplied in accordance with the load conditions. One form of the invention having now been described in detail, the mode of operation is now explained.

For purposes of description, let it be assumed that heat is being supplied to the generator 5 from the burner 10, fans 15 and 20 are operating to circulate ambient outside air over the condenser 6 and air to be conditioned over the evaporation load coil 19, respectively, and that the pumps 18 and 26 are operating to circulate refrigerant in a path through coil 19 and absorption solution through a path including the absorber 8, heat exchanger 9 and generator 5, respectively. Heat is supplied by burner 10 at a rate to heat the solution in the generator to a temperature of, for example, 340° F. The vapor from the separating chamber 11 then flows through the conduit 12 and ejector 40 therein to the condenser 6 where it is condensed to a liquid at a temperature of, for example, 135° F. Liquid refrigerant then flows through the conduit 13 and nozzles 17 into the evaporator 7 where it is evaporated to produce a cooling effect; and also through the conduit 33 and control valve 35 therein to the header 36 of the auxiliary evaporator 34 and then through the tubes 25 of the absorber 8 into the header 37.

The flow of refrigerant vapor from separating chamber 11 to condenser 6 through the ejector 40 produces a partial vacuum in the vapor space 38 of the header 37. Thus, refrigerant vapor is withdrawn from header 37 by the ejector 39 at a rate to cool the absorption solution to a temperature at which it will absorb refrigerant vapor at a vapor pressure to maintain the required evaporator temperature with a solution concentration below which crystallization is apt to occur even with the most adverse ambient temperature and load conditions of, for example, 120° F. Refrigerant vapor withdrawn from header 37 by ejector 40 mixes with the refrigerant vapor from the separating vessel 11 and is heated by the latter to a temperature above ambient so that both vapors are condensed in the condenser 6 by outside air without requiring any energy in addition to the heat supplied to the generator 5.

More specifically, absorption solution in the absorber 8 when maintained at a temperature of, for example, 115 degrees F. at the highest expected outside ambient temperature will absorb refrigerant vapor at a vapor pressure to produce a temperature in the evaporator 7 of 45° F. with a solution concentration of 62% so that the system may operate without danger of crystallization of salt from solution which might otherwise plug the lines. Thus, the absorption refrigeration system illustrated in FIGURE 1 may be air cooled at ambient temperatures as high as 120° F. to maintain an evaporation temperature of 45° F. without danger of salt crystallizing from solution.

A modified arrangement of auxiliary refrigeration system is illustrated in FIGURE 2 comprising a turbine-compressor unit to operate the auxiliary refrigeration system. The compressor is connected in a closed refrigeration system containing a refrigerant and is adapted to evaporate the refrigerant at a temperature below 115° F. and compress the refrigerant vapor to a temperature above 120° F. to insure a flow of heat to the atmospheric ambient for the most adverse conditions of operation. The turbine for operating the compressor is driven by the refrigerant vapor flowing from the generator toward the condenser.

The absorption refrigeration system illustrated in FIGURE 2 is generally the same as that described with respect to FIGURE 1 and comprises a generator 5a, separating chamber 11a, and conduit 12a connecting the separating chamber to a condenser 6a. Liquid refrigerant from the condenser 6a flows through the conduit 13a into the evaporator 7a where it is recirculated and evaporated for conditioning air. Refrigerating vapor from the evaporator 7a, flows through the conduit 21a into the absorber 8a where it is absorbed in absorption solution recirculated by the pump 26a. Part of the absorption solution being recirculated flows through one path 29a of heat exchange 9a and conduit 30a back to the generator 52 to complete a cycle. Strong solution flows from the separator 11a through the conduit 22a and other passage 23a of the heat exchange 9a, back into the absorber 8a.

Turbine 45 is connected in the conduit 12a between the separator 11a and condenser 6a and through which the expelled refrigerant vapor flows to convert energy therein to mechanically rotate the turbine wheel. For example, the generator 52 may be heated so as to expel refrigerant vapor at a pressure of, for example, 800 mm. Hg abs. and temperature of 355° F., and the turbine is designed to exhaust the vapor at 168 mm. Hg abs. and a temperature of 145° F. as controlled by the air-cooled condenser 6a.

Compressor 46 is mechanically connected to the turbine 45 for rotation thereby and its suction side is connected through a line 47 to the auxiliary evaporator 48. The high pressure outlet from the compressor 46 is connected through a line 49 to an air-coiled condenser 50, separate from condenser 6a, and then through a line 51 having a control valve 35a therein back to the header 52 of the auxiliary evaporator 48.

The evaporator 48 is generally of the same construction as that illustrated in FIGURE 1, having headers 52 and 53 at opposite sides of the absorber 6a with tubes 25a extending through the absorber and into the headers. The bottoms of the opposite headers 52 and 53 are connected by an equalizing line 54 having a depending U-tube section adjacent the header 52 into which a liquid refrigerant flows by gravity. The equalizing line 54 insures distribution of the refrigerant in opposite headers 52 and 53 with the liquid refrigerant flowing from header 52 to header 53, and refrigerating vapor flowing from the tubes 54 back into the header 52 where a vapor space 57 is provided.

During operation of the absorption refrigeration system illustrated in FIGURE 2 refrigerant vapor expelled from solution in generator flows from the separating chamber 11a through conduit 12a to operate the turbine 45 and rotate the compressor 46. Operation of the compressor 46 withdraws refrigerant vapor from the auxiliary evaporator 48 to cause the liquid refrigerant to evaporate and cool the absorber 8a so as to maintain the required temperature in the evaporator 7a, of, for example, 45° F. with a solution concentration below that at which crystallization would be apt to occur. The refrigerant vapor exhausting from the turbine 45 is condensed to a liquid by air circulated over the condenser 6a by a fan 15a to maintain a condensing temperature of, for example, 145° F. Refrigerant vapor from the auxiliary evaporator 48 is exhausted from the compressor 46 at a pressure and temperature to be condensed by atmospheric ambient air circulated over the condenser 50 by a fan 58 to maintain a condensing temperature of, for example, 130° F. Thus, the absorption refrigeration system utilizes energy of refrigerant expelled in generator 5a to operate an auxiliary refrigeration system for cooling the absorber 8a to the required temperature to produce a desired evaporator temperature without danger of salt crystallizing out of solution, while condensing the refrigerating vapor from both systems by outside ambient air.

FIGURE 3 illustrates a still further modified construction in which the auxiliary refrigeration system for cooling the absorber is entirely independent of the absorption refrigeration system, but operated from energy generated in the latter and transmitted through a heat exchanger.

The absorption refrigeration system illustrated in FIGURE 3 is generally the same as that illustrated and described in FIGURES 1 and 2 and comprises a generator 5b, a separator 11b connected to a condenser 6b through a conduit 12b, later to be described more in detail. The liquid refrigerant flows from the condenser 6b through a conduit 13b to an evaporator 7b where the liquid refrigerant is recirculated in heat exchange with the cooling load. Refrigerant vapor from the evaporator 7b flows through the conduit 21b into the absorber 8b where it is absorbed in absorption solution and the solution is recirculated in the absorber by pump 26b. Part of the absorption solution then flows through conduit 28b, one passage 29b of the heat exchanger 9b, and conduit 30b, back to the generator 5b. Strong solution flows from the separator 11b through the conduit 22b other passage 23b of the heat exchanger 9b and conduit 24b back to the absorber 8a.

The auxiliary refrigeration system for cooling the absorber 8b utilizes the same turbine 45b and compressor 46b with the turbine and compresser exhausting into separate air cooled condensers 62 and 63 connected together in a depending U-tube 66 at their outlet ends. Condensers 62 and 63 are air cooled by heat exchange with ambient air circulated over the condensers by fans 64 and 65. Liquid refrigerant in the auxiliary refrigeration system is continuously recirculated by a pump 67 connected to the depending U-tube 66 through a conduit 68. The bottom of the header 52b of the evaporator 48b is connected to an aspirating ejector 69 in the conduit 71 to withdraw liquid refrigerant from the header. The outlet from the pump 67 is connected to the bottom of the other header 53b through conduits 70 and 71 to insure distribution of the refrigerant throughout the auxiliary evaporator 48b.

In accordance with the modified system illustrated in FIGURE 3, the auxiliary refrigeration system is entirely separate from the absorption refrigeration system except that the systems are in heat exchange relation to operate the auxiliary system from energy residing in the absorption system. To this end, a heat exchanger 75 is provided between the two systems having one path 76 connected to line 12b between the separator 11b and the evaporator 7b; and another path 77 connected between the outlet from the refrigerant circulating pump 67 and the turbine 45b of the auxiliary system. Conduit 70 from pump 67 is connected through a branch 70b to path 77 through heat exchanger 75 which, in turn, is connected to turbine 45b through a conduit 78.

The absorption refrigeration system illustrated in FIGURE 3 operates in substantially the same way as explained with respect to the constructions illustrated in FIGURE 2. Heat supplied by the burner 10b expels refrigerant vapor from absorption solution and the two are separated in the separating chamber 11b. Refrigerant vapor flows through the line 12b, and passage 76 of the heat exchanger 75 where the refrigerant is condensed to a liquid. Liquid refrigerant flows from the heat exchanger 75 through line 13b to the evaporator 7b and vapor from the evaporator flows through the conduit 21b into the absorber 8b where it is absorbed in absorption solution to produce a particular temperature in the evaporator 73. Dilute solution from the absorber 8b is circulated by pump 26b through the line 28b, and one path 29b of the heat exchanger 9b back to the generator 5b. Strong solution flows from the separating chamber 11b through the conduit 22b, passage 23b of the heat exchanger 9b, back to the absorber 8b at the pressure produced by generator 5b to complete the cycle of the absorption solution.

Heat in the refrigerant vapor expelled in the generator 5b is transferred to the refrigerant in the auxiliary refrigeration system through the heat exchanger 75 to vaporize the auxiliary refrigerant. The vaporized auxiliary refrigerant then constitutes a motive fluid and flows through the turbine 45b to rotate compressor 46b. The suction produced by compressor 46b evaporates the liquid refrigerant in the auxiliary evaporator 48b at a pressure and temperature to maintain the desired temperature in the evaporator 7b of, for example, 45° F. with a solution concentration which avoids crystallization of salt from solution. Refrigerant from both the absorption refrigeration system and auxiliary refrigeration system, on the other hand, is condensed by air-cooled condensers 6b, 64 and 65, which operate at a temperature substantially above atmospheric temperatures for the most adverse operating condition.

It will now be observed that the present invention provides an absorption refrigeration system utilizing water as a refrigerant and a salt solution as an absorbent which is air-cooled. It will also be observed that the present invention provides an auxiliary refrigeration system which utilizes the energy developed in a conventional absorption refrigeration system to effect cooling of the absorber to a temperature which avoids crystallization of salt from solution at the desired evaporator temperature. It will further be observed that the present invention provides a refrigeration system of the type indicated which operates at a relatively high thermal efficiency. It will still further be observed that the present invention provides an improved absorption refrigeration system of the type indicated which is of relatively simple and compact construction, economical to manufacture and one which is reliable in operation.

While several embodiments of the invention are herein illustrated and described, it will be understood that further changes may be made in the method and apparatus without departing from the spirit or scope of the invention. Therefore, without limitation in this respect, the invention is defined by the following claims.

I claim:
1. A method of air cooling an absorption refrigeration system of the type using water as a refrigerant and a salt solution as an absorbent which comprises the steps of heating a first body of solution to expel refrigerant vapor therefrom, condensing the refrigerant vapor by heat exchange with ambient air to provide a first body of refrigerant, subjecting the liquid refrigerant to a second body of solution which absorbs refrigerant vapor at a pressure to cool the body of liquid refrigerant, providing a second body of refrigerant in heat exchange relation with the second body of solution, evaporating refrigerant vapor from the second body of refrigerant to cool the second body of solution, compressing the evaporated refrigerant vapor from the second body of refrigerant, condensing the compressed refrigerant vapor by heat exchange with ambient air, and performing the step of compressing refrigerant vapor from the second body of refrigerant by use of energy in the refrigerant vapor expelled from the first body of solution.

2. A method of air cooling an absorption refrigeration system in accordance with claim 1 which utilizes the flow of refrigerant vapor expelled from the first body of solution to aspirate a portion of the second body of refrigerant.

3. A method of air cooling an absorption refrigerant system in accordance with claim 1 which comprises the steps of circulating the second body of refrigerant in a closed circuit, and condensing the refrigerant vapor in said circuit separately from the refrigerant vapor expelled from the first body of solution.

4. A method of air cooling an absorption refrigeration system in accordance with claim 1 which comprises the steps of circulating the second body of refrigerant in a path separate from the path of flow of refrigerant expelled from the first body of solution, passing the refrigerant in said second body of refrigerant in heat exchange with the refrigerant vapor expelled from the first body of solution to vaporize the refrigerant in the second body to provide a motive fluid for aspirating and compressing the refrigerant vapor from said refrigerant in heat exchange with said second body of solution.

5. In an absorption refrigeration system of the type having a generator, a condenser, an evaporator, an absorber and conduits interconnecting the element to provide a path of flow for refrigerant from the generator through the condenser and evaporator to the absorber, a path of flow for dilute solution from the absorber to the generator and a path of flow for strong solution from the generator to the absorber, the combination with the elements of said system of a second refrigerant evaporator containing a refrigerant in heat exchange relation with said absorber, and means for withdrawing refrigerant vapor from the second refrigerant evaporator to cool the absorber, and compressing the withdrawn vapor to a pressure at which it dissipates heat to the outside atmosphere.

6. An absorption refrigeration system comprising a generator, condensing means including at least one condenser cooled by ambient air, an evaporator, an absorber, and conduits interconnecting the elements to provide a path of flow from the generator to the condenser and evaporator, a path of flow for refrigerant vapor from the evaporator to the absorber, a path of flow for dilute solution from the absorber to the generator and a path of flow for strong solution from the generator to the absorber, an auxiliary evaporator in heat exchange with the absorber and containing refrigerant, means operated by vapor expelled in the generator to withdraw refrigerant vapor from the auxiliary evaporator to cool the absorber and compress the vapor to a temperature higher than the temperature of the outside air, and said last named means being connected to the condenser means to transfer heat to the outside air.

7. An absorption refrigeration system in accordance with claim 6 in which the means for withdrawing and compressing refrigerant vapor from the auxiliary evaporator comprises an ejector in the conduit between the generator and condenser means and connected to the auxiliary evaporator.

8. An absorption refrigeration system in accordance with claim 7 in which the condenser means comprises a single condenser for receiving refrigerant vapor from both the generator and auxiliary evaporator.

9. An absorption refrigeration system in accordance with claim 6 in which the compression means comprises a turbine-compressor unit, said turbine being connected in the conduit between the generator and the condensing means, and said compressor being connected between the auxiliary evaporator and said condensing means.

10. An absorption refrigeration system in accordance with claim 9 in which the condensing means comprises separate condensers connected to the turbine and compressor, respectively.

11. An absorption refrigeration system in accordance with claim 10 in which the auxiliary evaporator, compressor and one condenser of the condensing means are connected in a closed circuit to provide an auxiliary refrigerating system.

12. An absorption refrigeration system in accordance with claim 10 in which the outlet from the separate condensers for the turbine and compressor are connected together in a closed circuit, a pump in said closed circuit, a loop circuit in the closed circuit connected to the auxiliary evaporator to recirculate liquid refrigerant therein, a heat exchanger having one passage in said closed circuit and another passage connected in a circuit from the generator to the evaporator of the absorption system whereby heated refrigerant vapor from the generator vaporizes refrigerant in the closed circuit to provide a motive fluid to operate the turbine.

13. An absorption refrigeration system in accordance with claim 6 in which the auxiliary evaporator is connected in a circuit to provide an auxiliary refrigerant system having an air cooled condenser for transferring heat to the ambient atmosphere, said absorber comprising a vessel having tubes extending therethrough, said auxiliary evaporator comprising said tubes and headers at opposite ends of the tubes, a conduit connecting the top of one of the headers to the means to compress refrigerant vapor, and a conduit connecting the air cooled condenser to one of the headers.

14. An absorption refrigeration system in accordance with claim 13 in which a balancing pipe connects the bottom of the headers to insure the flow of liquid refrigerant from one header to the other.

15. An absorption refrigeration system in accordance with claim 12 in which ejectors are provided in the loop circuit for drawing refrigerant from one header and delivering it to the other header, and a by-pass line between the outlet from said one header and ejector in the line to the other header.

References Cited

UNITED STATES PATENTS

| | | | |
|---|---|---|---|
| 2,795,115 | 6/1957 | Kumm | 62—148 |
| 3,015,940 | 1/1962 | Harwich | 62—141 |
| 3,301,000 | 1/1967 | Holbay | 62—148 |
| 3,314,246 | 4/1967 | Hopkins et al. | 62—494 |

LLOYD L. KING, *Primary Examiner.*

U.S. Cl. X.R.

62—141, 476, 485